Oct. 2, 1945.  E. A. STEWART  2,386,072
METHOD OF MAKING SPONGE IRON
Filed Feb. 28, 1944   2 Sheets-Sheet 1
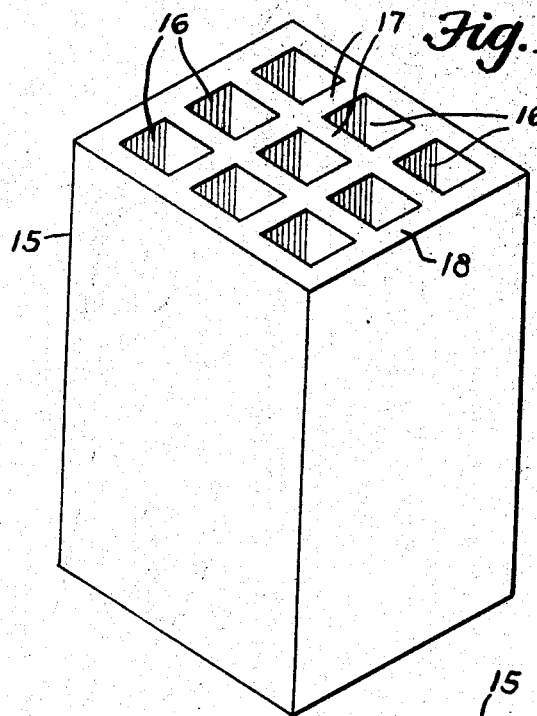
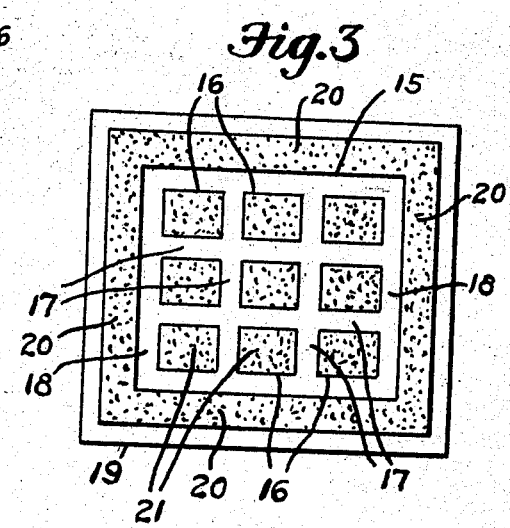
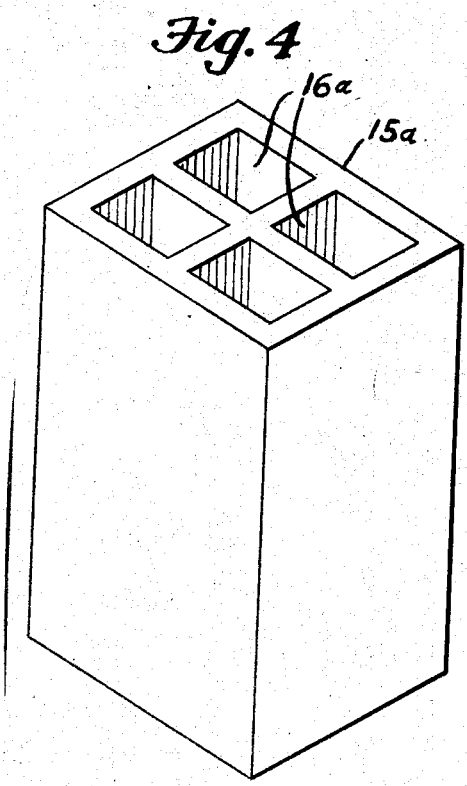
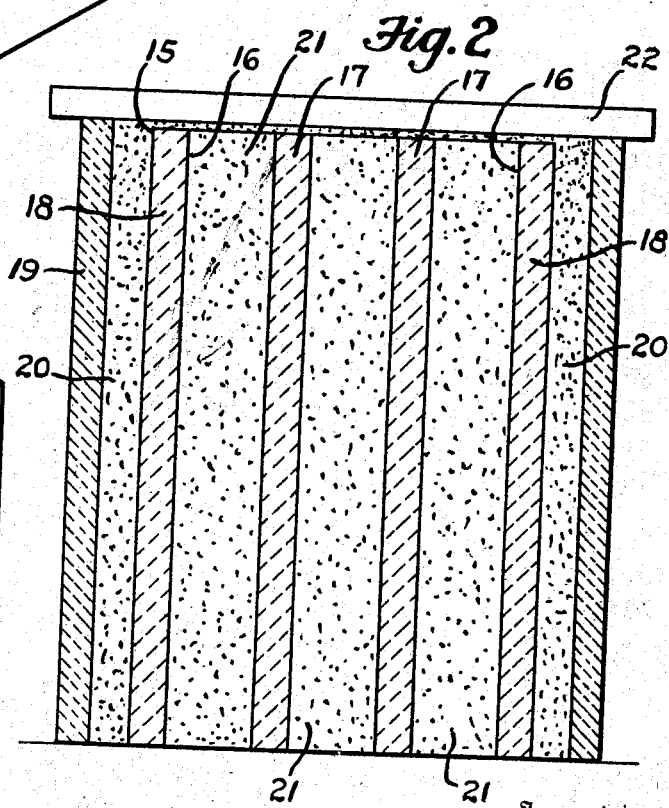
Inventor
Enos A. Stewart
By Frease and Bishop
Attorneys Oct. 2, 1945.  E. A. STEWART  2,386,072
METHOD OF MAKING SPONGE IRON
Filed Feb. 28, 1944  2 Sheets-Sheet 2
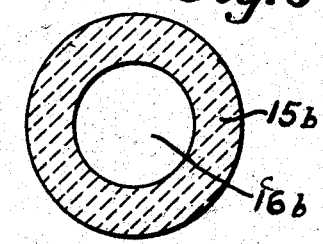
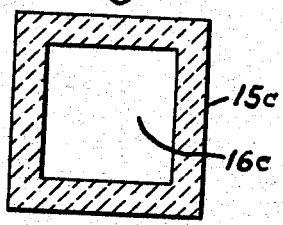
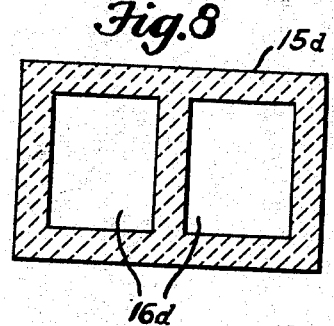
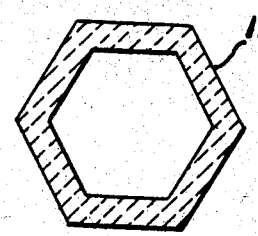
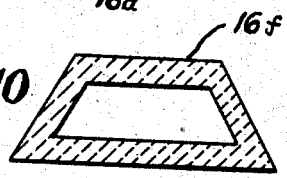
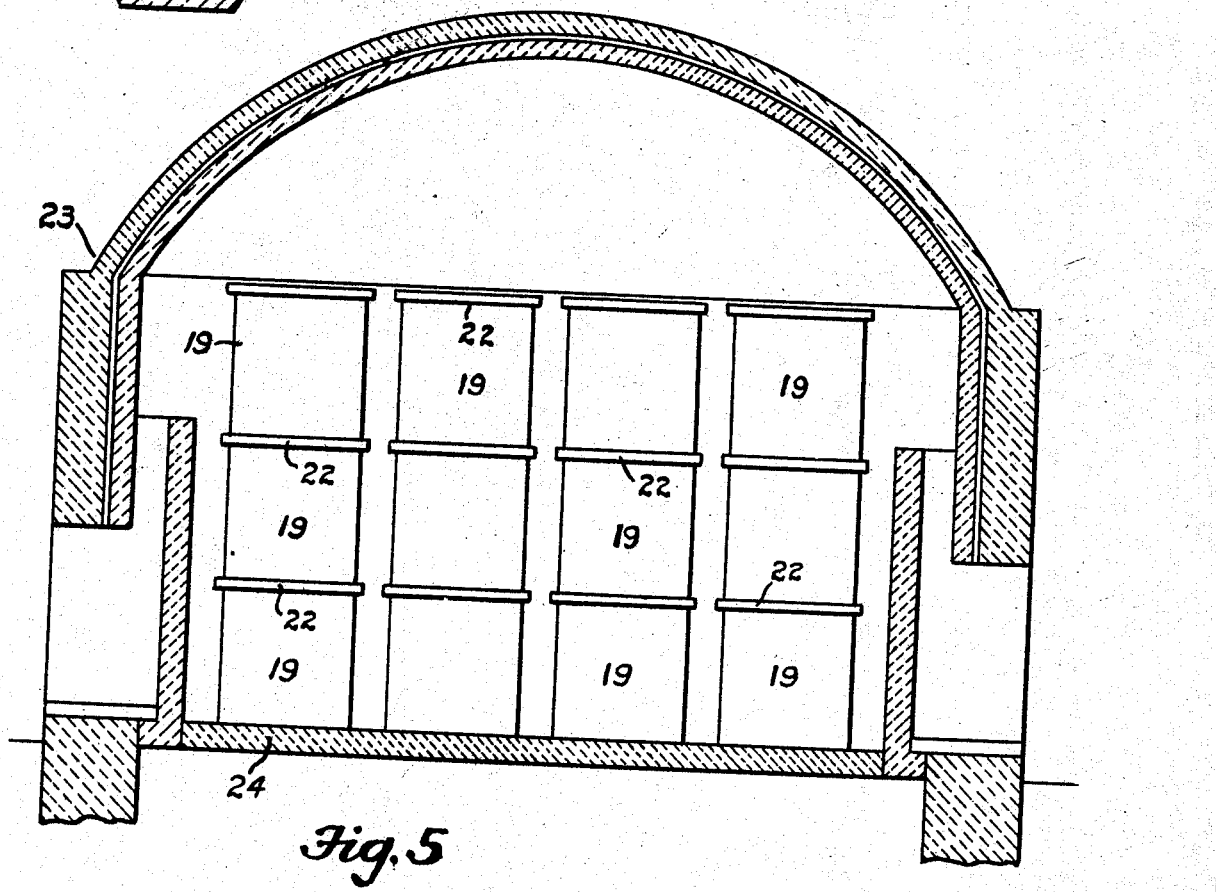
Inventor
Enos A. Stewart
By Frease and Bishop
Attorneys Patented Oct. 2, 1945

2,386,072

UNITED STATES PATENT OFFICE 2,386,072

METHOD OF MAKING SPONGE IRON

Enos A. Stewart, Canton, Ohio

Application February 28, 1944, Serial No. 524,161

9 Claims. (Cl. 75—33)

The invention relates to the reduction of metallic ores and oxides, and is more particularly concerned with the reduction of the various iron ores and oxides to produce sponge iron.

The invention has for its object the reduction of iron ores or oxides by a novel and simple method which consists in finely dividing the ores or oxides and mixing them only with a sufficient amount of a binder, such as a starch solution, and forming the mixture into a compact mass, as by extruding it through a die or pressing it in a mold to form a compact, compressed block or briquette of such thickness that heat will entirely penetrate directly through all portions thereof, so as to substantially entirely reduce the ores or oxides, placing the block or briquette within a sagger or similar receptacle, filling the sagger and entirely surrounding the block or briquette of ores or oxides with powdered carbonaceous material, and subjecting it to a sufficiently high temperature for a sufficient period of time to entirely reduce the ores or oxides producing a solid briquette or block of metallic iron.

It is a further object of the invention to provide for the reduction of iron ores or oxides by mixing finely divided ores or oxides with a suitable binder and extruding, molding or pressing the mixture into the form of a hollow briquette or block, placing the hollow formed article within a sagger or similar receptacle, filling the sagger and the opening or openings within the briquette with powdered coal or coke, and subjecting it to a sufficiently high temperature for a sufficient period of time to reduce the ores or oxides, producing a hollow briquette or block of sponge iron which may be easily handled and transported.

Another object is to provide for covering the upper open end of each sagger so that even though they are fired in an oxidizing atmosphere the ore or oxide briquette or block will be maintained under a reducing atmosphere since it is entirely enclosed and surrounded by the powdered carbonaceous, reducing material.

A further object of the invention is to provide a hollow briquette or block of ores or oxides all of the walls of which are of such thickness that the heat from the burning carbonaceous material on each side of each wall will entirely penetrate all portions of the briquette so as to completely reduce the ores or oxides.

A still further object is the provision of a process for the reduction of the natural iron ores such as hematite, limonite, magnetite, siderite, gothite, tungite, bog ores and the like, or iron oxides such as mill scale, flue dust, or other material containing appreciable amounts of ferric oxide ($Fe_2O_3$), ferroso-ferric oxide ($Fe_3O_4$), or ferrous oxide (FeO), which consists in mixing the ores or oxides with a small amount of a suitable binder, such as a starch solution, extruding, molding or pressing the mixture into a hollow briquette or block, drying the formed article, then placing it within a sagger or the like and completely filling the sagger and the opening or openings in the briquette with powdered coal or coke, and subjecting it to a temperature of about 2000° F. for a period of several hours to reduce the ores or oxides to a sponge iron briquette.

Another object is to provide a process for reducing iron ores or oxides in the manner above referred to in which a small amount of lime is mixed with the powdered coal or coke to assist in removing sulphur.

The above objects together with others which will be apparent from the drawings and following description, or which may be later referred to, may be attained by carrying out the process of making sponge iron from ores or oxides in manner hereinafter described in detail, reference being made to the accompanying drawings, in which:

Figure 1 is a perspective view of a hollow briquette or block formed of ore or oxide and a binder;

Fig. 2 a vertical sectional view through a sagger showing a hollow briquette or block of ores or oxides located therein and the sagger and interior of the briquette filled with powdered carbonaceous material;

Fig. 3 a top plan view of the filled sagger, on a slightly smaller scale;

Fig. 4 a perspective view of another shape of hollow block or briquette of ores or oxides and binder;

Fig. 5 a vertical, sectional view through a kiln showing the manner in which the saggers, containing the hollow briquettes and loose carbonaceous material may be stacked therein for carrying out the reduction process;

Fig. 6 a transverse sectional view through a hollow briquette or block of circular cross section;

Fig. 7 a similar view of a substantially square briquette;

Fig. 8 a transverse sectional view through an oblong, rectangular briquette or block;

Fig. 9 a similar view of a hollow block of hexagonal cross sectional shape; and

Fig. 10 a cross sectional view of still another shape in which the hollow briquette or block of ores or oxides and binder may be made.

Referring first more particularly to Figs. 1 to 3 inclusive and Fig. 5 in which similar numerals refer to similar parts, in carrying out the improved process, a hollow block or briquette as indicated generally at 15 may be formed from a mixture of the ore or oxide to be reduced together with a small amount of a suitable binder.

Either the natural iron ores such as hematite, limonite, magnetite, siderite, gothite, tungite, bog ores, etc. or any iron oxide such as mill scale, flue dust, or other material containing ferric oxide ($Fe_2O_3$), ferroso-ferric oxide ($Fe_3O_4$) or ferrous oxide (FeO) may be reduced to sponge iron by this process.

The ore or oxide is first reduced to a powdered condition by grinding or the like and is mixed with a small amount of suitable binder, a 7½% starch solution having been found very satisfactory for this purpose. A sufficient amount of the starch solution or other binder to bind the particles of ore or oxide together is mixed with the finely divided ore or oxide and may then be placed in a machine such as a brick machine and extruded through a die to form the hollow briquette or block of ore or oxide indicated in Fig. 1 provided with a plurality of internal openings or passages 16 spaced by partition walls 17. All of the partition walls 17 as well as the exterior walls 18 of the hollow briquette or block should be formed of such thickness that heat will penetrate directly therethrough so as to reduce the ore or oxide of which the briquette or block is formed in the manner hereinafter set forth in detail.

Instead of extruding the mixture of ore or oxide and binder through a die as above described, the hollow block or briquette 15 may be formed by casting, molding or pressing the mixture of finely divided ore or oxide and binder to the desired shape.

This hollow block or briquette of ore or oxide may then be dried and placed within a sagger or similar container indicated generally at 19 which may be formed of fire clay or other suitable material.

This sagger is preferably of slightly larger cross sectional area than the hollow block or briquette of ore or oxide so that finely divided particles of carbonaceous material, such as powdered coal, either anthracite or bituminous, or powdered coke as indicated at 20 may be placed therein to fill the space between the exterior walls of the hollow block 15 and the inner walls of the sagger. Powdered coal or coke as indicated at 21 is also placed within the interior openings or passages 16 in the hollow block filling the same as shown in Figs. 2 and 3.

The sagger with the hollow block of ore or oxide, and powdered coal or coke therein is placed upon the hearth of a furnace, kiln or the like and preferably closed at its upper end by the cover 22 which may be in the form of a flat slab of any suitable material, and the hollow block of ore or oxide embedded in the powdered coal or coke within the sagger is then subjected to a sufficiently high temperature for a sufficient period of time to reduce the ore or oxide to sponge iron, the hollow briquette retaining its form in the reduced condition so that a block or briquette of sponge iron is produced which may be easily transported and handled.

The reduction process may be carried out in the conventional type of kiln indicated generally at 23 in Fig. 5 in which case the saggers, filled as above described and as illustrated in Figs. 2 and 3, may be stacked in tiers within the kiln as shown in Fig. 5, the lowermost sagger of each tier resting upon the hearth or floor 24 of the kiln, each upper sagger in the tier resting upon the cover or slab 22 of the next lower sagger in the tier.

In order to assist in removing sulphur a small amount of lime may be mixed with the powdered coal or coke, the proportions varying from 3% to 10% of lime, depending upon the materials used, conditions, etc.

If the reduction process is carried out in an ordinary kiln, the kiln is fired as in conventional practice and may be brought up to a temperature of about 2000° F. and held at this temperature for a sufficient time to reduce the ores or oxides in the hollow block to sponge iron. At this temperature, the powdered coal or coke surrounding and located within the interior openings or passages of the hollow block of ore or oxide will be burned producing a reducing atmosphere entirely surrounding the ore or oxide block or briquette, the heat entirely penetrating all of the walls thereof so as to reduce the ores or oxides. Regardless of whether the kiln is fired using a reducing or oxidizing flame, it will be seen that the ore or oxide block or briquette being entirely surrounded by the burning carbonaceous material, will be maintained under a reducing atmosphere.

The time required for the reduction of the ore or oxide will vary somewhat with the size of the block, the degree of heat, the kiln, furnace or other heating chamber in which the reducing process is carried out and other conditions, but after the ore or oxide block has been brought to a temperature of about 2000° F., it will be reduced within a period of 4 or 5 hours, producing a hollow block or briquette of sponge iron.

Although a hollow block or briquette of the general form shown in Fig. 1 may be desirable for economic reasons, the invention may be carried out by forming the hollow briquette or block of ore or oxide in various shapes or sizes. For instance in Fig. 4 the hollow block or briquette 15a is of smaller cross sectional shape and with a less number of interior openings or passages 16a. In Fig. 6 is shown a hollow block or briquette 15b in the form of a hollow cylinder with a single central opening or passage 16b and in Fig. 7 the block 15c is of substantially square cross sectional shape with a single interior opening or passage 16c. In Fig. 8 the block 15d is of oblong, rectangular shape with two interior openings or passages 16d. The hollow block or briquette of ore or oxide may be formed in various other cross sectional shapes such as the hexagon 16e shown in Fig. 9 or the trapezoid 16f shown in Fig. 10. In each case, regardless of the size or shape in which the hollow briquette or block of ore is formed the process may be carried out in the manner above described.

I claim:

1. The process of reducing iron oxides which consists in forming a hollow block consisting of finely divided oxide and a binder, filling the interior and surrounding the exterior of said hollow block with finely divided carbonaceous material, holding the carbonaceous material in place by an inert casing and subjecting it to sufficient heat to generate reducing gases within and around the hollow block to substantially entirely reduce the oxides in the block producing a block of metallic iron.

2. The process of reducing iron oxides which consists in forming a hollow block consisting of finely divided oxide and a binder, filling the interior and surrounding the exterior of said hollow block with finely divided carbonaceous material and lime, holding the carbonaceous material and lime in place by an inert casing and subjecting it to sufficient heat to generate reducing gases within and around the hollow block to substantially entirely reduce the oxides in the block producing a block of metallic iron.

3. The process of reducing iron oxides which consists in forming a hollow block consisting of finely divided oxide and a starch binder, filling the interior and surrounding the exterior of said hollow block with finely divided carbonaceous material, holding the carbonaceous material in place by an inert casing and subjecting it to sufficient heat to generate reducing gases within and around the hollow block to substantially entirely reduce the oxides in the block producing a block of metallic iron.

4. The process of reducing iron oxides which consists in forming a hollow block consisting of finely divided oxide and a starch binder, filling the interior and surrounding the exterior of said hollow block with finely divided carbonaceous material and lime, holding the carbonaceous material in place by an inert casing and subjecting it to sufficient heat to generate reducing gases within and around the hollow block to substantially entirely reduce the oxides in the block producing a block of metallic iron.

5. The process of reducing iron oxides which consists in forming a hollow block consisting of finely divided oxide and about a 7% starch solution, filling the interior and surrounding the exterior of said hollow block with carbonaceous material and 3% to 10% lime, holding the carbonaceous material and lime in place by an inert casing, and subjecting it to about 2000° F. for a sufficient period of time to reduce the oxide, producing a block of metallic iron.

6. The process of producing a hollow block of metallic iron which consists in forming a hollow block consisting of finely divided iron oxide and a binder, filling the interior of said hollow block and surrounding the exterior thereof with carbonaceous material, holding the carbonaceous material in place by an inert casing and subjecting it to sufficient temperature for a sufficient period of time to reduce the oxide to metallic iron producing a block of metallic iron.

7. The process of reducing iron oxides which consists in forming an extruded block consisting of finely divided ore or oxide and a binder of such thickness that heat can penetrate therethrough so as to reduce the oxide entirely surrounding all of the exterior surfaces of said block with finely divided carbonaceous material, holding the carbonaceous material in place by an inert casing and subjecting it to sufficient heat to generate reducing gases around and through the block to substantially entirely reduce the oxides in the block to metallic iron producing a block of metallic iron.

8. The process of reducing iron oxides which consists in forming an extruded block consisting of finely divided ore or oxide and a binder, of such thickness that heat can penetrate therethrough so as to reduce the oxide, entirely surrounding all of the exterior surfaces of said block with finely divided carbonaceous material, holding the carbonaceous material in place by an inert casing and subjecting it to sufficient heat to generate reducing gases around and through the block to substantially entirely reduce the oxides in the block to metallic iron producing a block of metallic iron.

9. The process of reducing iron oxides which consists in forming an extruded block consisting of finely divided oxide and sufficient starch solution to form a binder, of such thickness that heat can penetrate therethrough so as to reduce the oxide, entirely surrounding all of the exterior surfaces of said block with finely divided carbonaceous material, holding the carbonaceous material in place by an inert casing and subjecting it to sufficient heat to generate reducing gases around and through the block to substantially entirely reduce the oxides in the block to metallic iron producing a block of metallic iron.

ENOS A. STEWART.